Oct. 5, 1965 W. P. BOOTHROYD 3,210,600

BEAM REGISTRATION CORRECTION CIRCUIT FOR STRIPED COLOR TUBE UTILIZING ERROR SIGNAL DERIVED FROM INDEXING AND COLOR INFORMATION SIGNALS TO VARY IMPEDANCE IN DEFLECTION COIL CIRCUIT

Original Filed April 3, 1951 2 Sheets-Sheet 1

INVENTOR.
WILSON P. BOOTHROYD
BY
[signature]
ATTORNEY

Oct. 5, 1965 W. P. BOOTHROYD 3,210,600

BEAM REGISTRATION CORRECTION CIRCUIT FOR STRIPED COLOR TUBE UTILIZING ERROR SIGNAL DERIVED FROM INDEXING AND COLOR INFORMATION SIGNALS TO VARY IMPEDANCE IN DEFLECTION COIL CIRCUIT

Original Filed April 3, 1951 2 Sheets-Sheet 2

INVENTOR.
WILSON P. BOOTHROYD

BY

Allen V. Hazeltine
ATTORNEY 3,210,600

BEAM REGISTRATION CORRECTION CIRCUIT FOR STRIPED COLOR TUBE UTILIZING ERROR SIGNAL DERIVED FROM INDEXING AND COLOR INFORMATION SIGNALS TO VARY IMPEDANCE IN DEFLECTION COIL CIRCUIT

Wilson P. Boothroyd, Huntingdon Valley, Pa., assignor to Philco Corporation, Philadelphia, Pa., a corporation of Delaware Application Apr. 15, 1960, Ser. No. 22,645, now Patent No. 3,068,317, dated Dec. 11, 1962, which is a continuation of Ser. No. 219,093, Apr. 3, 1951. Divided and this application Mar. 6, 1962, Ser. No. 177,836
14 Claims. (Cl. 315—27)

The present invention relates to cathode ray tube systems for use in the reconstitution of visible images from signals representative of video intelligence. More particularly it relates to such systems for use in the reconstitution of colored images from signals representative of intelligence with respect to a plurality of color components of a televised scene.

This application is a division of my copending application Serial No. 22,645, filed April 15, 1960, now Patent 3,068,317, granted December 11, 1962, which application is, in turn, a continuation of my application Serial No. 219,093, filed April 3, 1951, and now abandoned.

One of the principal difficulties which beset communications receivers using such scanning devices as cathode ray tubes in the presentation of their received intelligence lies in the fact that it is extremely difficult to perform the necessary scanning in a sufficiently uniform and consistent manner. Although by no means confined thereto, the nature and magnitude of this problem is particularly well illustrated by the operational shortcomings of color television receivers. Consequently, the detailed discussion to follow will concern itself principally with such color television receivers, always pointing out, as the explanation progresses, the broader fields of applicability of the inventive concept.

One particular system of color television which is presently arousing widespread interest is the so-called dot-sequential system. In such a system, there is produced a signal which is successively indicative of the red, green and blue color content of small elements of the scene which is to be televised. For this purpose, there may, for example, be provided three simultaneously scanning television cameras, each of which views the scene to be televised and each of which is equipped with a primary color filter, so that one camera produces a video output signal whose amplitude varies in accordance with the green elements of the scene, while the other two cameras produce output signals respectively indicative of the red and blue scene elements. The amplitudes of the three output signals are then successively sampled, usually at equally time-spaced intervals, producing a series of pulses occurring at the sampling intervals, and having amplitudes corresponding to the amplitude of the respective one of the three sampled color signals, also at the sampling intervals. The rate at which each of the original color signals is sampled is very high, being equal to 3.6 megacycles in some presently realized arrangements. These output pulses are then applied to a filter which converts them into a sinusoidally varying 3.6 megacycle signal, superimposed on a more slowly varying, or average component. This color signal, suitably combined with the necessary blanking and synchronizing impulses is eventually received and from it the televised scene must be reconstituted.

As indicated, the composite picture signal produced in the above-described manner is representative of color information at three time-spaced intervals during each cycle of the 3.6 megacycle component. Furthermore, since the original three continuous color signals are sampled in a predetermined recurrent order, the composite signal will also be representative of the three colors in the same order.

The receiver is further provided with a cathode ray tube whose screen is formed of minute and closely adjacent elements emissive of colored light in response to cathode ray tube electron beam impingement and care is taken that these elements be disposed in the path of each electron beam sweep traversal so that the beam successively traverses elements respectively emissive of light of the three primary colors in the same order in which these are represented in the composite picture signal.

With the beam intensity controlled, as usual, by the received signal, all that remains to be done is to ensure that the electron beam be incident upon a screen element emissive of light of one particular color precisely at the interval at which the picture signal is representative of such color.

Unfortunately this has proven to be extremely difficult to achieve for the following reasons.

Firstly, the position of the beam at any time during a sweep traversal of the screen is dependent upon a complicated deflection system whose beam control characteristic cannot in practice be made perfectly linear. As a result, the rate of beam traversal will vary in the course of each sweep traversal and the consecutive beam positions at which the beam intensity corresponds to color information will not be uniformly spaced along each sweep path. Furthermore, this non-linearity may be different for different sweep traversals any may even change from time to time due to aging of deflection system components and the like.

Such uncontrollable sweep non-linearity is, of course, incompatible with the only simple arrangement of screen elements which is achieved by spacing them equally along the sweep trace of the beam, because it produces a non-uniform sweep traversal rate, so that, with equally spaced elements, the beam will sometimes be incident on a particular element at the time when its intensity is proportional to information of the proper color, while at other times it will be incident upon a particular element when its intensity is not indicative of any color, or even of the wrong color. With 558 screen elements disposed along each sweep trace, an error of only two-tenths of one percent in the rate of beam deflection would result in a positional error of one full screen element near the end of the sweep, so that the resultant color rendition would be completely erroneous.

To obtain accurate color rendition, the linearity would actually have to depart from the ideal by considerably less than two-tenths of one percent.

The foregoing discussion assumes that the screen elements are actually uniformly spaced along each sweep trace. In practice this would rarely be the case, so that even perfect sweep linearity would not always insure properly timed beam impingement.

The task of compensating for errors arising from these two sources is rendered even more difficult by reason of the fact that changes in the path followed by the picture signal between the transmitter and the receiver frequently produce varying delay of consecutive portions of the picture signal with the result that the rate of reception of picture information may be temporarily accelerated or retarded. Changes due to this entirely uncontrollable cause can, of course, not be anticipated by adjustment of the receiver equipment.

It is, accordingly, a prime object of the invention to provide apparatus which cooperates with a scanning type data presentation device to reduce time differences between intervals at which received intelligence is available and intervals when such intelligence can be presented by the device.

It is another object of the invention to provide means cooperating with a cathode ray tube to determine differences between the actual time of impingement of the cathode ray tube electron beam upon predetermined portions of the tube screen and the intended time of such impingement and to modify the beam sweep so as to reduce this difference.

It is still another object of the invention to provide a color television receiver with means adapted to sense actual impingement of the display tube beam upon a predetermined portion of the screen, further adapted to derive information respecting the desired time of such impingement from the received picture signal and still further adapted to control the sweep rate of the display tube beam to decrease differences between the actual and desired times of impingement.

It is a still further object of the invention to provide means, in a color television receiver, for controlling the rate of sweep of the receiver cathode ray tube beam so as to compensate for color distortion produced by sweep non-linearity and other types of non-uniform operating characteristics.

To achieve the foregoing objects, as well as others which will appear, I provide my receiver with means for deriving a signal indicative of cathode ray tube beam impingement upon such discrete segments of the beam sweep path as are adapted to produce visual indications of picture intelligence. I provide further means for producing a signal indicative of the occurrence of discrete intervals at which the picture signal is representative of picture intelligence, and I provide still further means responsive to relative changes between these signals to control the sweep rate of the beam so as to minimize such relative changes.

To this end, the receiver cathode ray tube is equipped with so-called indexing elements, which may comprise elements incorporated in the screen structure and disposed between consecutive groups of three differently colored light emissive screen elements. Such indexing elements produce an electrical pulse signal each time the beam impinges on one of them, and these pulses in turn provide the requisite indication of beam impingement upon the picture constituting screen elements. Note that the time spacing between consecutive ones of these pulses depends upon both linearity of beam sweep and uniformity of screen element spacing.

As for the above-mentioned signal indicative of the occurrence of discrete intervals at which the picture signal is representative of picture intelligence, it is immaterial to the practive of my invention just how this signal is produced. However, the usual color television system provides for the transmission of a color synchronizing signal which is independent of picture intelligence and whose frequency is indicative of the actual rate of occurrence of the aforesaid intervals. This synchronizing signal may be separated from the remainder of the composite signal at the receiver and used to produce a signal having the same frequency and phase characteristics and whose purpose it is to provide the desired indication of the occurrence of intelligence representative signal intervals.

Further in accordance with the invention, this signal derived from the synchronizing signal and the signal derived from the indexing elements of the tube are both supplied to a phase comparator where they produce an output potential which is indicative of the phase difference between the two signals. This output potential is then utilized to vary the normal rate of deflection of the beam across the screen of the cathode ray tube in such a manner as to maintain a predetermined desired phase difference between the two signals. The deflection system can be initially adjusted so that the uncontrolled rate of traversal of the beam across colored light emissive screen elements will be substantially the same as the rate of occurrence of intervals at which the received signal is representative of picture intelligence. So long as these rates are the same, the two signals respectively representative thereof will have constant phase difference and a given constant output potential from the phase comparator will result. The control system is then proportioned so that a constant phase comparator output of the said given value produces no control action on the deflection system. When, due to any of the various causes hereinbefore enumerated, these two rates are no longer the same, the phase comparator output will change. This output is applied to the deflection system as a correction signal with such polarity as to reduce the phase comparator output change to a minimum.

A system of the type heretofore broadly outlined is by no means limited, in its applicability, to color television systems, but is useful wherever signal intelligence is available for reproduction only at discrete intervals.

The detailed construction and operation of apparatus embodying the invention will be more readily understood from a consideration of the following detailed description together with the accompanying drawings wherein.

Figures 1, 2:
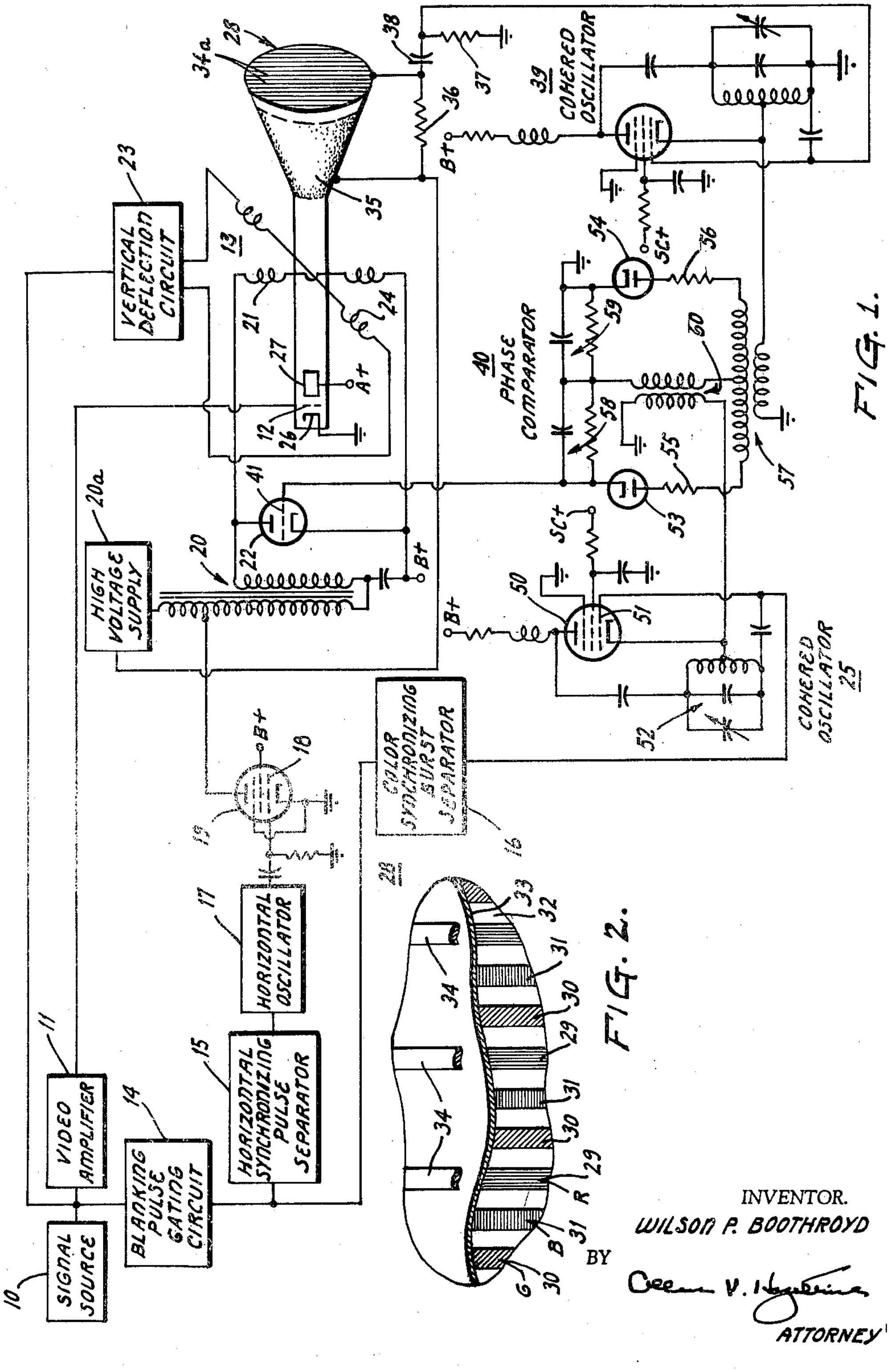
FIGURE 1 shows that portion of a color television receiver which incorporates an embodiment of my invention, together with such conventional apparatus as is intimately related thereto.
FIGURE 2 is an enlarged plan view of a cathode ray tube screen which may be used in the embodiment of the invention shown in FIGURE 1.

Illustrated in FIGURE 1 to which more particular reference may now be had, is a signal source 10, which may comprise such components of a conventional television receiver as antenna, tuner, radio-frequency amplifiers, converter, intermediate-frequency amplifiers, and video detector. The signal which emanates from source 10 is then the composite received picture signal reduced to its lowest or video frequency range. This signal comprises the aforedescribed rapidly varying color component superimposed upon a more slowly varying average brightness component. These two components are, at intervals of one scanning line, obliterated by the conventional blanking pulse which cuts off the cathode ray tube scanning beam during retrace intervals. Pedestaled upon the leading half of each such blanking pulse is a horizontal synchronizing pulse, as is usual in both color and black-and-white television receivers. Upon the trailing half of each blanking pulse there is found the aforedescribed color synchronizing signal which, as has been indicated, consists of a small number of half cycles of a sine wave having the nominal frequency of the color signal component and having a reference phase indicative of the times at which this color signal is representative of color intelligence. This composite video signal, or at least such portions thereof as are representative of picture intelligence, are supplied by way of a conventional video amplifier 11 to the beam intensity control grid 12 of receiver display tube 13. The same composite video signal is also supplied to blanking pulse gating circuit 14, which is so constructed as to be transmissive of signals applied thereto only during the intervals when a blanking pulse is present. Numerous conventional arrangements will operate to perform this function, as, for example, a triode amplifier tube whose control grid electrode is normally biased so far negatively as to maintain the tube cut off at all times except during application of the strongly positive blanking pulses. There will then appear, at the output of blanking pulse gating circuit 14, only the blanking pulses together with the horizontal synchronizing pulse and the color synchronizing burst which is superimposed on each one of these blanking pulses. These synchronizing signals are now further directed into separate channels, this being accomplished by means of horizontal synchronizing pulse separator 15 and color burst separator 16, respectively. Separators 15 and 16 may take any one of a number of conventional forms. For example they may comprise narrow band-pass filters respectively transmissive of the fundamental frequency components of the horizontal synchronizing pulses and of the color synchronizing bursts. In a typical case, the horizontal synchronizing pulse separator 15 may consist of a narrow band-pass filter transmissive of signals of the standard 15.75 kilocycle line scanning frequency to the substantial exclusion of all other signals. Similarly, in the particular case under consideration, the color synchronizing burst separator 16 may consist of a filter transmissive of 3.5 megacycle color synchronizing signals, again to the substantial exclusion of signals of all other frequencies. The output of horizontal sync pulse separator 15 is utilized to drive a conventional horizontal oscillator in the usual manner. The horizontal oscillator 17 is arranged so as to produce a sawtooth wave of voltage which is applied to the control grid electrode 18 of horizontal output tube 19, where it operates to control the output of this tube 19 in the usual manner. The output of tube 19 is then applied, by way of horizontal output transformer 20, to the horizontal deflection coil 21 of cathode ray tube 13, to control deflection of its beam in the usual manner. The high voltage end of the primary winding of transformer 20 is, as is usual, connected to a flyback type high voltage supply 20*a*, where the oscillation set up in the winding by the collapse of the transformer voltage during beam retrace is utilized to produce second anode potential for tube 13.

It is customary, in deflecting circuits of the sort above described, to provide a so-called damping tube, connected across the deflecting coil, which functions to damp out oscillations which would otherwise be set up in the coil during the rapid return of the beam between successive horizontal scans. As is well known, such a tube may also be adjusted to improve the linearity of the scanning. In the present arrangement, there is provided a triode 22, similarly connected across the deflection coil 21, but which, in addition to performing the usual functions of the conventional damper tube aforementioned, also performs a further function in accordance with the present invention, as will be pointed out hereinafter.

Vertical beam deflection, on the other hand, may be provided by entirely conventional vertical deflection circuits 23 actuated by received signals from source 10 and connected to vertical deflection coil 24.

The output signal produced by color synchronizing burst separator 16 is supplied to a conventional cohered oscillator 25 which may comprise a multigrid vacuum tube 50 whose control grid electrode 51 is connected to the burst separator 16. The other electrodes of tube 50 are supplied with the usual operating potentials and the cathode, anode and control grid electrode 51 are further interconnected in oscillatory circuit relation by means of resonant circuit 52 whose inductance and capacitance elements are selected with such relative values that the oscillator is normally operative to produce a signal of the nominal frequency of the color synchronizing bursts. Such a cohered oscillator is illustrated in FIGURE 21.14 on page 593, of "Microwave Receivers," which is volume 23 of the Massachusetts Institute of Technology Radiation Laboratory Series, published 1948, by McGraw-Hill Book Co., Inc., New York. As a result of being supplied with such color synchronizing bursts from burst separator 16, this oscillator is actually operative to produce a continuous signal having the same frequency and phase characteristics as the intermittently occurring color synchronizing bursts. Thus cohered oscillator 25 provides a signal which is indicative of the rate of occurrence of intelligence representative portions of the received signal. This, it will be recalled, is one of the signals required for the operation of my system, as hereinbefore briefly explained. It will also be recalled that the other signal needed for this purpose is one which provides information as to the times and rate of traversal of the cathode ray tube electron beam across screen elements capable of producing visible indications of this signal intelligence. In accordance with the invention, this second signal is derived directly from cathode ray tube 13. For this purpose the cathode ray tube is provided with so-called indexing means. A variety of such indexing means are known and it will be understood, therefore, that the one described here has been selected only for purposes of illustration, and that any other equivalent means may be substituted therefor without departing from the scope of my inventive concept. Briefly, cathode ray tube 13, in addition to having the conventional elements such as electron emissive cathode 26, accelerating anode 27, horizontal deflection coil 21 and vertical deflection coil 24, is also provided with a screen structure 28 arranged as shown in the enlarged fragmentary view of FIGURE 2, to which reference may now be had. This screen structure will be seen to comprise a plurality of groups of parallel vertical phosphor stripes 29, 30 and 31 of very narrow transverse dimensions which are preferably so closely juxtaposed that individual stripes cannot be resolved by the eye of an observer at ordinary viewing distance. These phosphor stripes are characterized in that every third one, as for example every stripe numbered 29, is emissive of light of one of the primary colors, such as red for example, in response to electron beam impingement thereon, while the intermediate stripes 30 and 31 produce light of the other two primary colors, say green and blue, respectively, in response to such electron beam impingement. The order of occurrence of red, blue and green light emissive stripes in the path of the electron beam during its horizontal sweep across the screen is, of course, the same as the order of occurrence of intervals at which the received signal is representative of intelligence relating to these three primary colors. Suitable materials constituting the phosphor stripes 29, 30 and 31 are well known to those skilled in the art and further details concerning the same are believed to be unnecessary. In the present embodiment these phosphor stripes are seen to have been applied directly to the glass face plate 32 of the cathode ray tube. However, it will be understood that this need not be and that, instead, the entire screen structure 28 may be formed on a suitable light transparent base which is independent of the face plate 32 and may be spaced therefrom.

The screen structure 28 further comprises a thin electron permeable layer 33 which covers phosphor stripes 29, 30 and 31 and which preferably further constitutes a mirror for reflecting light generated by the phosphor stripes. In practice the layer 33 may be a light reflecting aluminum coating which is formed in well known manner.

Arranged over every third phosphor stripe, such as stripe 29, is an indexing stripe 34 consisting of a material, such as gold, having a secondary emission ratio substantially different from that of the material of coating 33. Since the detailed representation of this entire screen structure would obscure the important features of the indexing arrangement, only the indexing stripes have been actually shown, and these have been diagrammatically represented by vertical lines 34*a*. For a more detailed discussion of the disposition and composition of screen structures including indexing stripes, reference may be had to U.S. applications of David E. Sunstein, Serial No. 547,621, filed November 18, 1955, now Patent 3,054,853, issued September 18, 1962, and of Carlo V. Bocciarelli, Serial No. 198,709, filed December 1, 1950, now Patent 3,066,239, issued November 27, 1962, both assigned to the assignee of the present invention. Second anode 35 which, as is usual, consists of a conductive coating applied to the inside of the cathode ray tube near the screen which attracts secondary emission electrons emanating from these indexing stripes by virtue of the high positive potential applied thereto from high voltage supply 20a. Thus, every time the electron beam sweeps across an indexing stripe during its horizontal sweep traversal of the screen, the flow of secondary emission electrons to second anode 35 will momentarily increase and so will the current through index output resistor 36 which is connected between the second anode and the tube screen. These momentary current increases indicative of intervals during which the beam is traversing an indexing stripe are transformed into corresponding pulses by R-C network 37, 38 whose output is, in turn, utilized to control a cohered oscillator 39. This latter may, in all respects, be identical to the cohered oscillator 25 to which the output of burst separator 16 is supplied and, consequently, does not require separate description here. Suffice it to mention that this cohered oscillator produces an output signal having the same frequency and the same phase as the indexing pulses derived from the cathode ray tube screen. Cohered oscillator 39 thus constitutes the source of a signal which is indicative of intervals at which the cathode ray tube electron beam is incident upon colored light emissive elements.

It will be apparent, from a consideration of the foregoing description, that the amplitude of the indexing signal produced by the index output circuit hereinbefore described will be somewhat dependent upon the intensity of the electron beam which is, in turn, determined by signal information. This contamination of the indexing pulses by the received signal may, in some cases, necessitate more elaborate precautions to make sure that the cohered oscillator 39 is actuated only by the indexing pulses proper. Various means are available for reducing or eliminating the effect of this contamination, as for example those described in U.S. Patent No. 2,644,855, issued July 7, 1953, to William E. Bradley on an application filed December 28, 1950, and assigned to the assignee of the present invention. It is, of course, within my contemplation that suitable means of this type be used whenever the indexing signal produced as hereinbefore described is excessively contaminated by the received signal.

The output signal derived from cohered oscillator 25 and that produced by cohered oscillator 39 are now applied to the input circuits of a phase comparator 40 which may be of any conventional type adapted to produce a unidirectional output potential proportional to the phase difference between the signals supplied thereto. For example, this phase comparator may comprise a pair of diode vacuum tubes 53 and 54, whose anodes are connected together by series resistors 55 and 56 and by the secondary winding of transformer 57. The cathodes of these same diodes are connected together through two serially connected resistance-capacitance networks 58 and 59 and the junction of these R-C networks is connected to a center tap on the aforementioned secondary winding of transformer 57 through the secondary winding of another transformer 60. When the primary windings of these transformers 57 and 60 are, as illustrated, connected to the cohered oscillators 39 and 25, respectively, so that the oscillatory output signals of the latter are developed thereacross, then there will be developed across the two R-C networks 58 and 59, a unidirectional potential whose magnitude varies in proportion to variations in the phase difference between the two oscillator output signals. Such a phase comparator is shown in FIGURE 1 on page 1401 of volume 37 of "Proceedings of the I.R.E.," 1949. This unidirectional output potential produced by phase comparator 40 is supplied to control grid 41 of damper triode 22 for the purpose of controlling the latter in a manner hereinafter explained.

Observe now that, so long as the frequencies of the signals derived from cohered oscillators 25 and 39 are the same and so long as their phase relationship remains constant, the phase comparator output potential will remain constant. More particularly, a certain constant unidirectional potential will be produced by phase comparator 40 whenever the rate of beam sweep traversal across the screen of cathode ray tube 13 is exactly the same as the rate of occurrence of intelligence representative portions in the received signal. In accordance with my invention, the circuit parameters associated with horizontal output tube 19 and damping tube 22 are so adjusted that when the grid 41 of damping triode 22 is supplied with an output of the phase comparator which is indicative of equality of sweep and intelligence occurrence rates, triode 22 will be caused to conduct uniformly throughout the entire sweep interval with such intensity as to produce a current through horizontal deflection coil 21 which will sweep the beam across the tube face at a rate just sufficient to maintain this output potential constant. The phase comparator 40 is further adjusted so that a phase delay of the signals derived from cohered oscillator 39 with respect to those produced by cohered oscillator 25, denoting a rate of beam sweep traversal which is too slow with respect to the rate of intelligence occurrence will produce a change in the unidirectional output potential of the phase comparator in such a sense as to decrease current flow through triode 22. This permits increased deflection current to flow through deflection coil 21 whereby the rate of beam sweep traversal of the cathode ray tube is increased. Conversely, accelerated production of signals by cohered oscillator 39 with respect to cohered oscillator 25, which denotes too rapid a beam sweep traversal will then produce a change in phase comparator output potential in such a sense as to increase triode conduction, thereby diverting current from the deflection coil and decreasing the rate of beam deflection.

The effect of this cooperative functioning of phase comparator 40 and damping triode 22 is to insure the desired correspondence between the rate of occurrence of intelligence representative portions of the received signal and the rate of beam sweep traversal of cathode ray tube screen elements which are adapted to reproduce this intelligence.

Instead of using a two winding transformer such as that designated by reference numeral 20 in FIGURE 1, it is sometimes preferred to use an auto-transformer between the horizontal output tube of the horizontal deflection system and the horizontal deflection coil of the cathode ray tube. Whenever that is the case there will exist a direct current connection between the output electrode of this horizontal output tube and the deflection coil. This makes it inappropriate to use a damping triode such as tube 22 of FIGURE 1 for a deflection coil current controlling element in accordance with the invention, inasmuch as its control grid would not be exclusively determinative of its rate of conduction. Instead, anode voltage changes brought about by conduction changes in the horizontal output tube would produce an additional uncontrollable effect on the deflection coil current. In such a case, there may be substituted for the triode damping tube arrangement of FIGURE 1 a different circuit, such as, for example, that of FIGURE 3 to which more detailed reference may now be had.

Figure 3:
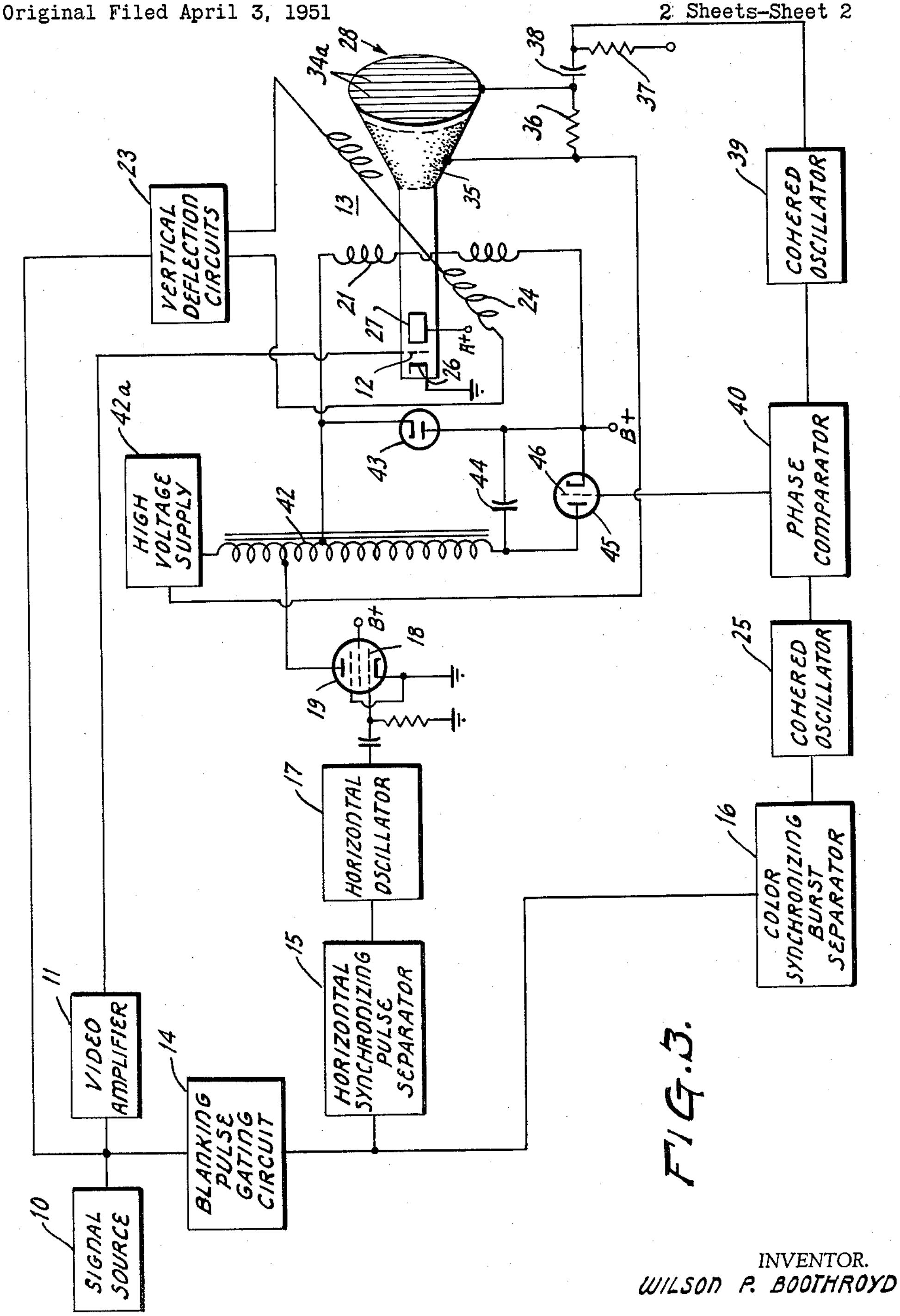
FIGURE 3 shows another embodiment of my invention together with the same conventional apparatus as is shown in FIGURE 1.

Note, first of all, that with the exception of the actual deflection circuit of the cathode ray tube, FIGURE 3 is substantially identical to FIGURE 1. That is, both embodiments have numerous identical components and these have, for ease of comparative identification, been designated by similar reference numerals. Furthermore, certain of the elements which were shown by circuit diagrams in FIGURE 1 have been illustrated, for the sake of simplicity, by block diagrams in FIGURE 3.

Thus, the system of FIGURE 3, like that of FIGURE 1, includes a signal source 10 at whose output there is available the composite received video signal together with its blanking pulses and horizontal and color synchronizing signals. This composite signal is again supplied to the beam intensity control grid 12 of cathode ray tube 13 by way of video amplifier 11, while the blanking pulses alone actuate gating circuit 14 thereby supplying synchronizing signals to horizontal synchronizing pulse separator 15 and color synchronizing bursts to burst separator 16. A horizontal oscillator 17 is controlled by the output of the horizontal synchronizing pulse separator 15, and the oscillator in turn supplies the control grid electrode 18 of horizontal output tube 19. The color synchronizing burst separator 16, on the other hand, feeds a cohered oscillator 25 which produces a continuous output signal having the same frequency and phase characteristics as the color bursts.

Like that of FIGURE 1, cathode ray tube 13 includes the conventional elements such as electron emissive cathode 26, accelerating anode 27, horizontal and vertical deflection coils respectively designated 21 and 24, second anode 35 and a screen 28 including indexing stripes diagrammatically represented by vertical lines 34*a*. The index signal output from this cathode ray tube is again derived across index output resistor 36, formed into pulses by R-C network 37, 38 and utilized to drive cohered oscillator 39 which produces an output signal having the frequency and phase characteristics of the index signals. The outputs of cohered oscillators 25 and 39 are again supplied to the input circuits of phase comparator 40. As for the deflection system proper, this latter now consists of a single winding auto-transformer 42. Across a portion of this auto-transformer there is connected the horizontal deflection coil 21 in parallel with a conventional diode damping tube 43, while a conventional high voltage supply 42*a* is energized from the high-voltage end of winding 42. A conventional voltage boosting capacitor 44 is also provided between the anode of damping diode 43 and the low voltage end of auto-transformer winding 42. It is across this voltage boosting capacitor 44 that an auxiliary control triode 45 is connected for the purposes of my invention. To the control grid electrode 46 of this auxiliary triode 45, there is supplied the unidirectional output potential produced by phase comparator 40 in response to the signals supplied thereto to cohered oscillators 25 and 39. While the arrangement of the deflection system, with the exception of the provision of auxiliary triode 45 looks somewhat like a conventional system of this type, it nevertheless differs therefrom in that the circuit parameters associated with the horizontal output tube 19 are so chosen as to render diode 43 conductive during the entire sweep interval rather than only during parts thereof as was the practice in the prior art. In this arrangement, the presence of auxiliary triode 45 has the effect of controlling the load on boosting capacitor 44 so as to adjust the effective voltage across the damper diode 43 to provide the desired rate of change of current in the deflection coil 21. Once again, the system is so adjusted that, with proper correspondence between the rate of beam sweep traversal, as determined by the rate of change of deflection current in deflection coil 21, and the rate of intelligence occurrence in the received signal, there will be produced, by phase comparator 40, a unidirectional control potential which will control the conduction through triode 45 so as to maintain the aforesaid desired correspondence. Again the phase comparator will be so arranged that changes in the relative rate of the beam sweep traversal and of the intelligence occurrence will produce compensatory changes in the conduction of auxiliary triode 45 and therefore also in the rate of current change in deflection coil 21.

The preceding discussion has been limited to television receiver systems using electromagnetic deflection systems for their cathode ray tubes. It will be understood, however, that the applicability of my inventive concept is by no means limited thereto. Thus, for example, the teachings of my invention may be applied with equal success to the deflection control of electrostatic deflection systems or indeed of any others that may be conceived. Since numerous modifications in this and other respects will occur to those skilled in the art without departing from my inventive concept, I desire the latter to be limited only by the appended claims.

I claim:

1. In a cathode ray tube system, a source of a deflecting signal, a transformer supplied with said deflecting signal and responsive thereto to produce an output signal, means supplied with said output signal for deflecting the beam of a cathode ray tube across the screen of said tube, means for deriving a signal indicative of the rate of deflection of said beam across said screen, and variable impedance means shunting the output of said transformer and responsive to said derived signal to modify said output signal supplied from said transformer to said deflecting means.

2. In a cathode ray tube system, a source of a deflecting signal, a deflection yoke supplied with said signal for deflecting the beam of a cathode ray tube across the screen of said tube, means for deriving a signal indicative of the rate of deflection of said beam across said screen, and variable impedance means shunting said yoke and responsive to said derived signal to modify said deflecting signal supplied to said yoke.

3. In a cathode ray tube system, a source of a deflecting signal, a deflection yoke supplied with said signal for deflecting the beam of a cathode ray tube across the screen of said tube, means for deriving a signal indicative of the rate of deflection of said beam across said screen, and controllable electronic means responsive to said derived signal to vary the impedance shunting said yoke to modify said deflecting signal supplied to said yoke.

4. In a cathode ray tube system, a source of a deflecting signal, a deflection yoke supplied with said signal for deflecting the beam of a cathode ray tube across the screen of said tube, means for deriving a signal indicative of the rate of deflection of said beam across said screen, and controllable electronic means having at least triode elements and responsive to said derived signal to vary the impedance shunting said yoke to modify said deflecting signal supplied to said yoke.

5. In a color television system of the type wherein an electron beam cathode ray tube has respective groups of phosphor strips parallelly disposed across its face, apparatus for insuring that the electron beam is incident upon the proper phosphor strip at the proper time, comprising:

(a) means for deriving from said tube a signal indicative of the rate of deflection of said beam across the face of said tube, (b) means for comparing said derived signal with a signal indicative of the instantaneous condition of a color information signal in said system so as to produce an error signal therefrom, and (c) variable impedance means connected in shunt with a deflection coil circuit of said tube and responsive to said error signal for controllably diverting deflection current from said coil according to changes in the magnitude of said error signal.

6. Apparatus of claim 5 wherein said means under clause (a) includes indexing stripes disposed across the face of said tube, said means under clause (b) includes a phase comparator containing two undirectional elements, and said means under clause (c) includes a triode.

7. In a cathode ray tube system:

(a) first means for supplying a deflection signal, (b) second means responsive to said deflection signal for deflecting the beam of a cathode ray tube across the screen of said tube, (c) third means for deriving a signal indicative of the rate of deflection of said beam across said screen, (d) a phase comparator responsive to said derived signal and a color synchronizing signal for producing an error signal representative of the phase difference between said derived signal and said color synchronizing signal; and (e) a variable impedance device for controllably diverting current of said deflection signal from said deflection coil in response to said error signal.

8. In combination:

(a) a cathode ray tube having color and indexing stripes disposed across its face, (b) means for causing an electron beam to sweep across the face of said tube, (c) means for generating a train of index pulses indicative of the rate of deflection of said beam across said screen, (d) a first cohered oscillator responsive to said index pulses for providing a first continuous alternating signal whose frequency and phase are indicative of said rate of deflection, (e) a source of a color synchronizing burst signal, (f) a second cohered oscillator responsive to said bursts for providing a second continuous alternating current signal having the same frequency and phase as said burst signal, (g) a phase comparator for providing a continuous direct current error voltage proportional to the phase difference between said first and second alternating current signals, and (h) means responsive to said error voltage for controlling the speed of said electron beam.

9. The combination of claim 8 wherein said last-named means includes a variable impedance device for controllably diverting current from a deflection coil associated with said tube.

10. The combination of claim 9 wherein said variable impedance device is a vacuum tube.

11. In a color television system:

(a) a cathode ray tube including deflection means for deflecting an electron beam across the face of said tube in response to a deflection signal, (b) means, including a transformer, for supplying a deflection signal to said deflection means, (c) variable impedance means connected across an output winding of said transformer for controlling the magnitude of the deflection signal supplied by said transformer to said deflection means and thereby control the sweep speed of said electron beam, and (d) means for altering the impedance of said variable impedance means in proportion to the amount of error in the actual sweep speed of said electron beam.

12. The invention of claim 11 wherein said variable impedance means comprises a vacuum tube having a control grid and said last-named means comprises a phase comparator arranged to compare the phase of a signal indicative of the speed of said beam with the phase of a color information signal and supply a proportional phase error voltage to said control grid of said vacuum tube.

13. In a color television system:

(a) a cathode ray tube, (b) means for deflecting an electron beam across the face of said cathode ray tube, said means including a horizontal output amplifying device arranged to excite a single-winding autotransformer, a horizontal deflection coil and a damper diode, said deflection coil and said damper diode being connected to form a parallel circuit, one terminal of which is connected to an output terminal of said autotransformer, a voltage boosting capacitor connected between the other terminal of said parallel circuit and another output terminal of said autotransformer, and (c) variable impedance means, connected in parallel with said capacitor for controlling the magnitude of a deflection signal supplied to said deflection coil and thus the sweep speed of said electron beam, and (d) means for altering the impedance of said variable impedance means in proportion to the amount of error in the actual sweep speed of said electron beam.

14. The invention of claim 13 wherein said variable impedance means comprises a vacuum tube having a control grid and said last-named means comprises a phase comparator arranged to compare the phase of a signal indicative of the speed of said beam with the phase of a color information signal and supply a proportional phase error voltage to said control grid of said vacuum tube.

References Cited by the Examiner

UNITED STATES PATENTS

| | | | |
|---|---|---|---|
| 2,564,588 | 8/51 | Wendt | 315—24 X |
| 2,671,129 | 3/54 | Moore | 315—24 X |
| 2,921,117 | 1/60 | Liebschner | 178—5.4 |

DAVID G. REDINBAUGH, *Primary Examiner.*

RALPH G. NILSON, *Examiner.*